(12) United States Patent
Walker et al.

(10) Patent No.: US 7,830,259 B2
(45) Date of Patent: Nov. 9, 2010

(54) METHOD AND APPARATUS FOR RFID INITIATED INTERACTIVE RETAIL MERCHANDISING

(75) Inventors: Bradley K. Walker, Lincoln, NE (US); Matthew T. Dorsey, Lincoln, NE (US)

(73) Assignee: Nanonation Incorporated, Lincoln, NE (US)

( * ) Notice: Subject to any disclaimer, the term of this patent is extended or adjusted under 35 U.S.C. 154(b) by 693 days.

(21) Appl. No.: 11/548,275

(22) Filed: Oct. 10, 2006

(65) Prior Publication Data

US 2007/0182555 A1    Aug. 9, 2007

Related U.S. Application Data

(60) Provisional application No. 60/725,561, filed on Oct. 11, 2005.

(51) Int. Cl.
    *G08B 13/14* (2006.01)
(52) U.S. Cl. .......... 340/572.1; 235/385; 340/5.91; 340/691.6
(58) Field of Classification Search .......... 340/572.1, 340/572.8, 10.1, 10.6, 691.6, 5.9–5.92; 235/375, 235/385; 705/28
    See application file for complete search history.

(56) References Cited

U.S. PATENT DOCUMENTS

| | | | |
|---|---|---|---|
| 6,335,686 B1 * | 1/2002 | Goff et al. | 340/572.4 |
| 6,601,764 B1 * | 8/2003 | Goodwin, III | 235/385 |
| 6,714,121 B1 * | 3/2004 | Moore | 340/10.3 |
| 6,903,656 B1 * | 6/2005 | Lee | 340/572.1 |
| 7,392,948 B2 * | 7/2008 | Smith et al. | 235/385 |
| 7,420,467 B2 * | 9/2008 | Patenaude et al. | 340/572.1 |
| 7,511,601 B2 * | 3/2009 | Eisenberg et al. | 340/572.1 |
| 2003/0174099 A1 * | 9/2003 | Bauer et al. | 340/572.1 |
| 2005/0242958 A1 * | 11/2005 | Lyon et al. | 340/572.8 |
| 2007/0085681 A1 * | 4/2007 | Sawyer | 340/572.1 |

* cited by examiner

*Primary Examiner*—Thomas J Mullen
(74) *Attorney, Agent, or Firm*—Husch Blackwell LLP; Mark E. Stallion

(57) ABSTRACT

An apparatus and method to detect consumer choices of products by use of RFID tags associated with a product and RFID readers to detect movement of the tag, which can initiate a presentation of relevant digital media based on the event and tag detected. The present invention is a new method of utilizing digital merchandising software, and RFID tags or other similar emitter identification tags as a potential input technology. The concept of the present invention can be considered a concept of "reverse RFID", where the RFID reader and supporting CPU keeps track of tags in proximity to the reader and then triggering events based on separation from reader (i.e. the RFID reader no longer detects the presence of an RFID tag because the tag has been moved out of the range of the reader). The movement of the tag out of the detection range of the reader can be the result of a potential customer picking up a product and removing it from the shelf, where the product has an RFID tag associated therewith.

20 Claims, 5 Drawing Sheets

METHOD AND APPARATUS FOR RFID INITIATED INTERACTIVE RETAIL MERCHANDISING

CLAIM FOR PRIORITY

This application claims benefit of priority to U.S. provisional application Ser. No. 60/725,561 entitled "Method and apparatus for RFID initiated interactive retail merchandising" filed Oct. 11, 2005, whose inventors are Bradley K. Walker and Matthew T. Dorsey.

BACKGROUND OF INVENTION

1. Field of Invention

This invention relates generally to merchandising and, more particularly, to retail shelf merchandising.

2. Background Art

Digital signage or the use of electronic media in retail stores and other spaces has traditionally been accomplished through the use of static lists of media assets played back on a display in sequential order at designated time intervals. This system allows for these displays to show specific media elements related to specific products. There is very little in the way of other examples in this area. The concept of Radio Frequency Identification (RFID) enabled inventory control has been considered, but exclusively in the context of controlling inventory of products on the shelf with the sensors detecting when shelves needed to be restocked or products reordered. Some industries have experimented with this approach, but many of the projects were abandoned due to customer privacy issues and cost constraints. Similarly, some retailers have attempted to get manufacturers to attach RFID tags to every product—again, for inventory management not point-of-sale marketing and messaging, but faced cost issues. RFID has also been used for active detection, where a user or consumer must place a product or tag near a reader for it to be read similarly to a bar code or mag card swipe. These systems are typically used for entry and security systems. It is apparent from the prior art that RFID tags have not been effectively utilized for retail marketing.

BRIEF SUMMARY OF INVENTION

The invention is a means to detect consumer choices of products by use of RFID tags associated with a product and RFID readers to detect movement of the tag, which can initiate a presentation of relevant digital media based on the event and tag detected. The present invention is a new method of utilizing digital merchandising software, and RFID tags or other similar emitter identification tags as a potential input technology. The concept of the present invention can be considered a concept of "reverse RFID", where the RFID reader and supporting CPU keeps track of tags in proximity to the reader and then triggering events based on separation from reader (i.e. the RFID reader no longer detects the presence of an RFID tag because the tag has been moved out of the range of the reader). The movement of the tag out of the detection range of the reader can be the result of a potential customer picking up a product and removing it from the shelf, where the product has an RFID tag associated therewith. In a further embodiment, the present invention comprises motion-detection.

The present invention allows for shelves and other fixtures used in retail and public space to have an integrated RFID reader and antenna attached to or embedded within shelves or other product display fixture. RFID tags can be attached to products that are placed on a product display shelf. While on the shelf, the RFID tag is in proximity to the reader such that the reader can detect the presence of the tag and transmit the appropriate present tag signal for that particular RFID tag detected. The present tag signal can be received and registered as present to the computer and software system to which the reader is communicably connected. The computer and software can maintain a list of tags present. The RFID reader can continuously monitor for the presence of an RFID tag or can perform periodic monitoring.

When the product is lifted from the shelf, the RFID tag leaves the range of the reader and is no longer detected by the reader. The RFID reader can transmit a product not present signal indicative of a product and associated tag being removed from the shelf or the computer can merely detect the absence of a given product's RFID tag. This event can cause the product and associated RFID tag to be removed from the software list of tags present. This list can be monitored and utilized as an inventory management tool. This event can also trigger the software to display selected digital media assets correlated to the RFID tag being removed, including product endorsements, product information, ordering information or presentment of an action button to request additional information or assistance, on digital displays (LED, CRT, plasma, projection, and other comparable displays) located in or near the fixture. In a further embodiment, these digital displays can also be touchscreen displays.

The software system can keep track of all products lifted, and the media played in response thereto, and reports that data to a server which allows for monitoring, administration and reporting of one or more of these devices. This system allows for these displays to show specific media elements related to specific products. By detecting the lift of the product from the shelf or display using RFID proximity tags and readers, the system responds with the appropriate media item(s) based on rules established in the software controlling the system. In addition, this system allows for the remote and automated counting of product lifts from the shelf so enabled. It allows the product manufacturer to provide a marketing message to a consumer while they are holding the product in their hand at the point of decision. It also allows the manufacturer and/or retailer to measure the interest in a product as demonstrated through the number of consumer lifts off the shelf and as compared against sales data for the period, and other metrics.

The system is predicated on software systems developed for the purpose of operating computer-driven customer devices, particularly customer interactive devices such as for example monitors, with the addition of the specified RFID components and associated functionality of the software and configuration settings.

The invention can focus on product information and promotion at the shelf. It only requires demonstration products or sample products (far fewer in number than all products in inventory) to be outfitted with the tags and can be used either with active participation by the user (they hold product up to a reader) or passive (where the user simply does what they would normally do—pick up the product). The resulting action is then manifested by a Product and RFID Tag not present signal from the RFID reader to the computer, which ultimately manifests the action by a playback on a display tied closely to or proximately to the shelves and/or products that promote the product and engage, inform or excite the user and prompts purchase of the item.

The display can be integral with the shelf or product display fixture or the display can be separate having wireless or hardwire connectivity with the RFID reader and computer system. A disadvantage of previously known RFID implementations is that they were not focused on marketing or promotion to the consumer. Most RFID implementations require active participation (user brings within proximity to get a read) versus the present invention, which uses "reverse RFID" (i.e., "reverse-detection")—where the product registers continuously or periodically until it is removed. Passive (lift) detection can be implemented rather than where the customer holds the product and associated tag close to a RFID reader.

These and other advantageous features of the present invention will be in part apparent and in part pointed out herein below.

BRIEF DESCRIPTION OF THE DRAWINGS

For a better understanding of the present invention, reference may be made to the accompanying drawings in which.

DETAILED DESCRIPTION OF INVENTION

Figure 1:
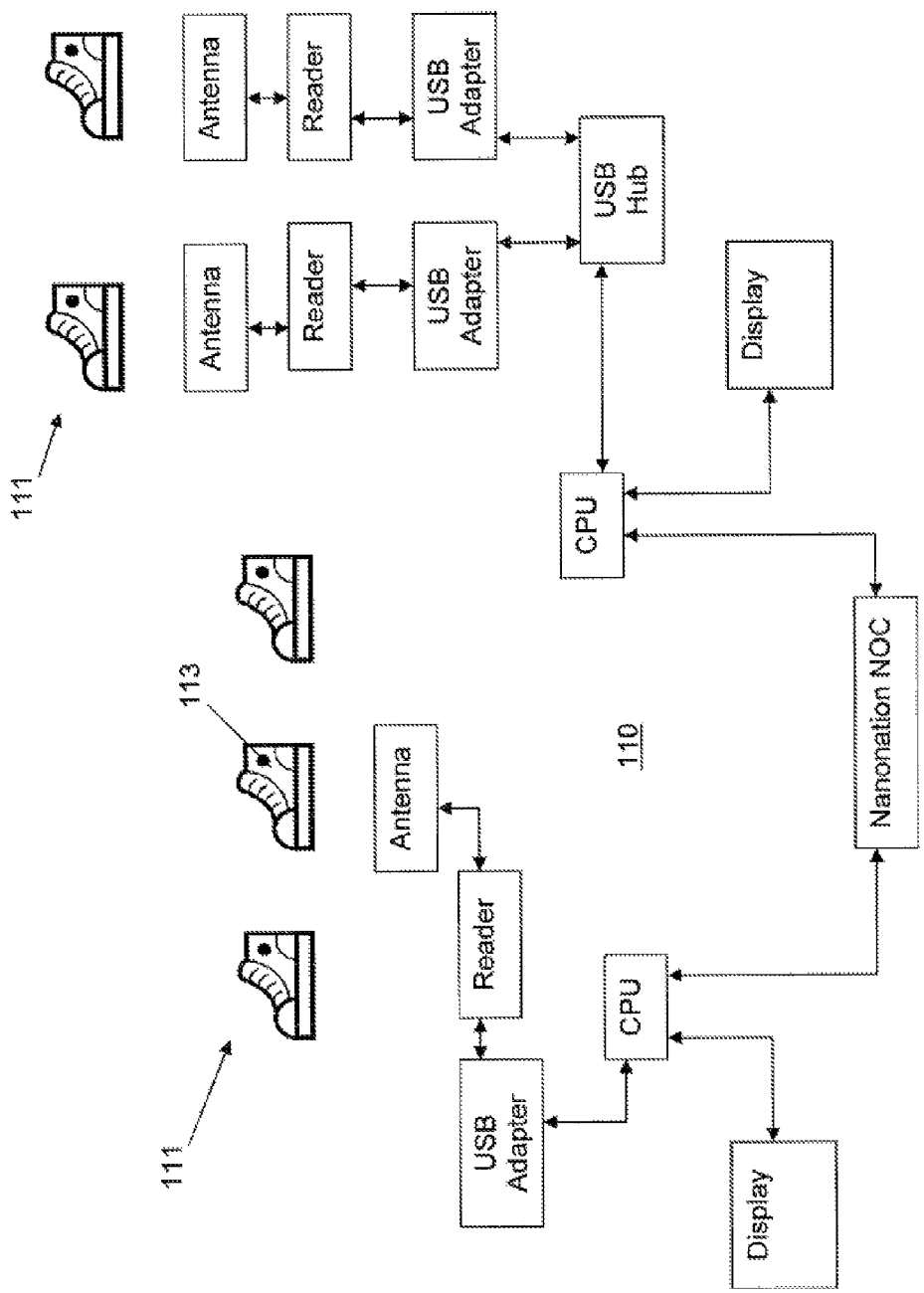
FIG. 1 is a functional block diagram of a single shelf configuration having multiple products thereon and a multi platform/shelf configuration, each having a single product thereon.
Figure 2:
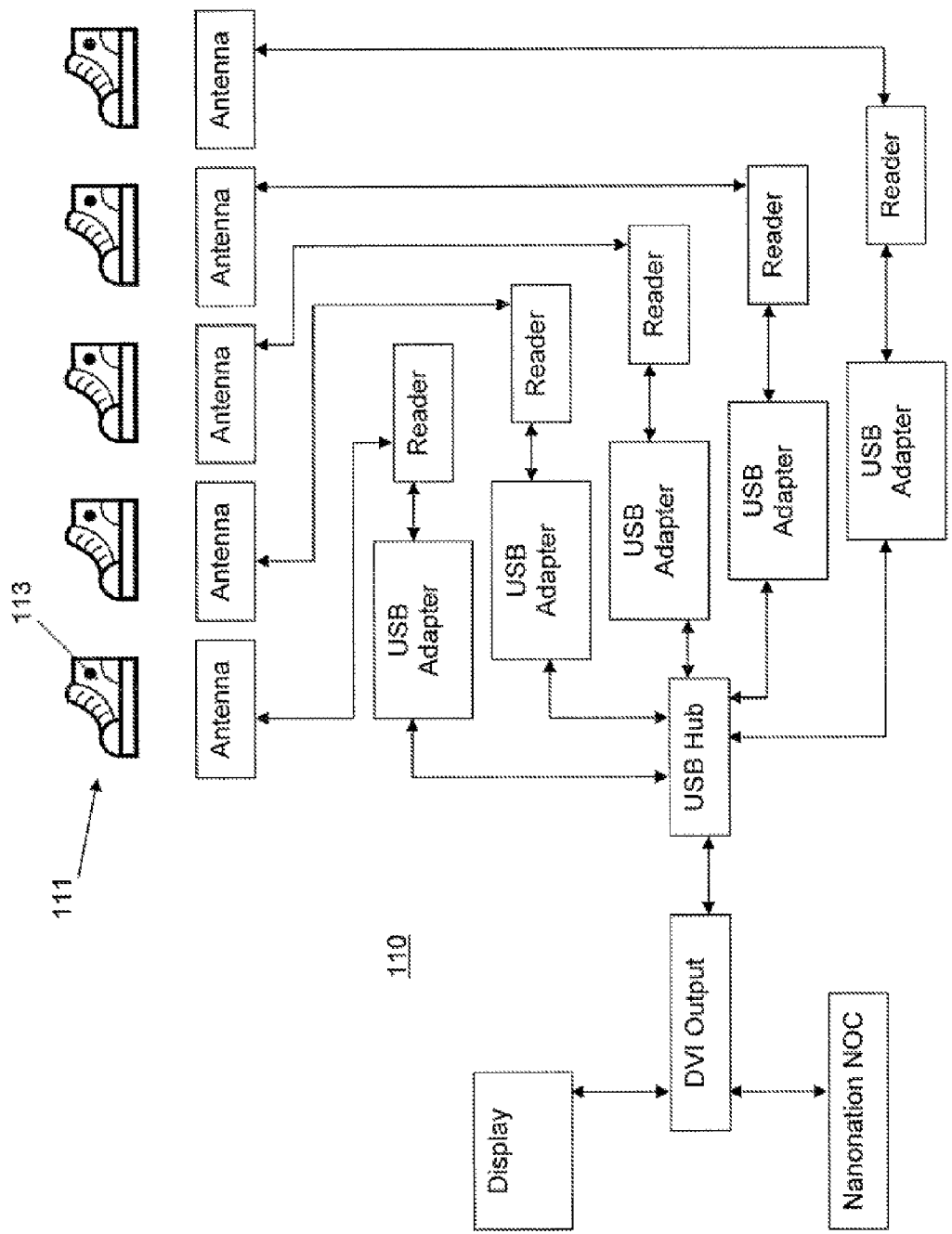
FIG. 2 is a functional block diagram of a multi platform/shelf configuration, each having a single product thereon.
Figure 3:
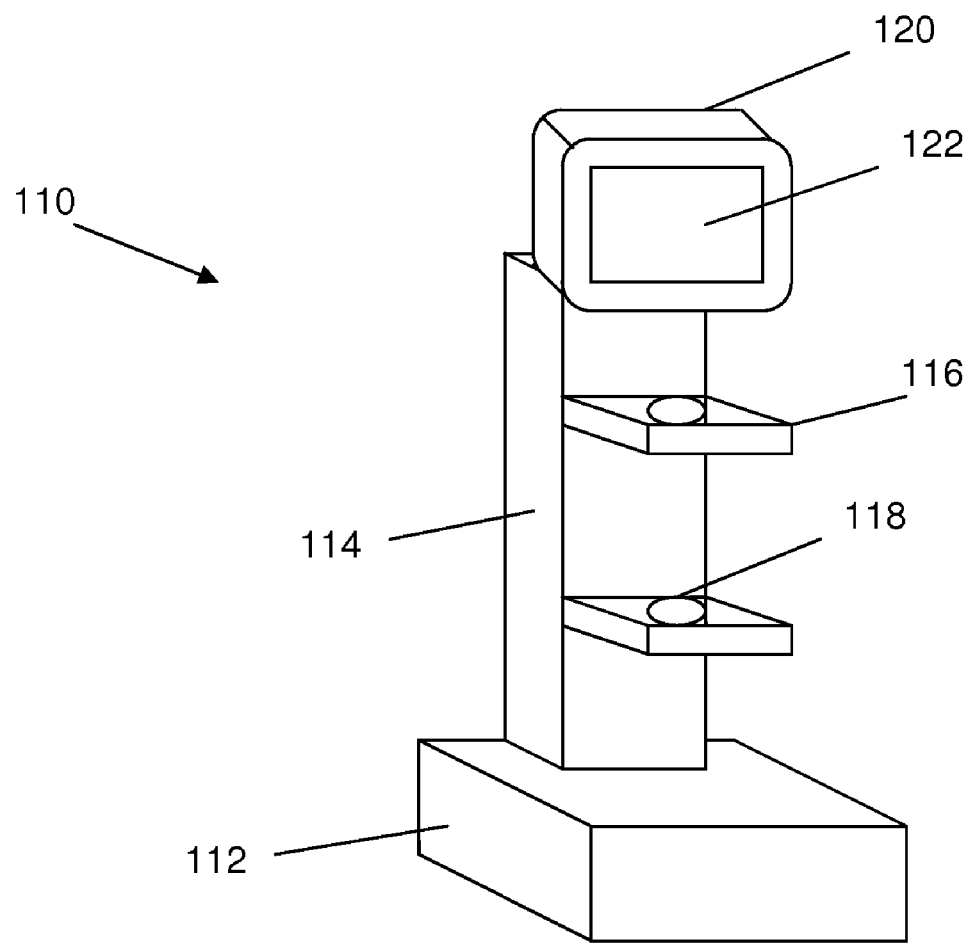
FIG. 3 is a perspective view of multiple product display fixture configurations.
Figure 4:
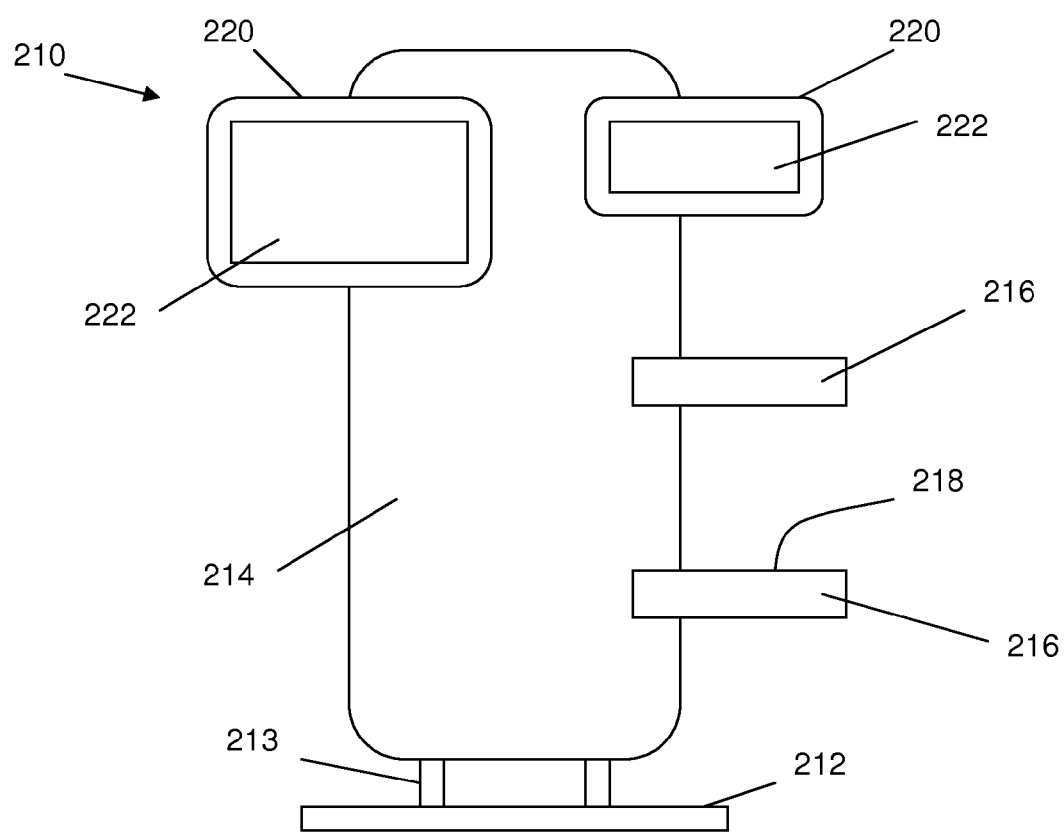
FIG. 4 is an elevation view of a product display fixture having multiple shelves for a single product on each shelf and the display is attached to the fixture as well a panel on which marketing indicia can be placed.
Figure 5:
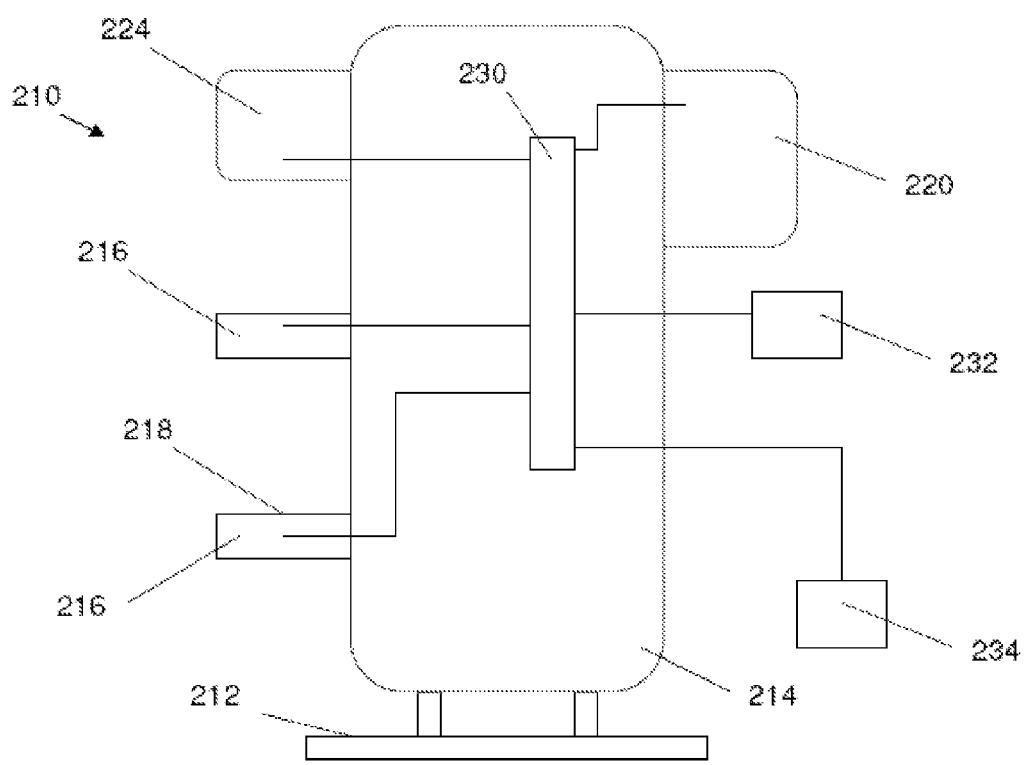
FIG. 5 is an elevation view of the electronics for the Antenna, RFID Reader, USB Adapter and CPU and connectivity.

According to the embodiment(s) of the present invention, various views are illustrated in FIGS. 1-5 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present invention comprising a product display fixture having an integral RFID reader and computing system operable to track movement of an RFID tagged product from the display fixture teaches a novel apparatus and method for utilizing RFID tags to initiate playback on a media display correlating promotional material.

One embodiment of the present invention comprises an apparatus for reverse-detection merchandising. In this embodiment, the apparatus comprises an identification tag reader, an identification tag at a starting location within range of the identification tag reader; and a computing system. The identification tag is located at a starting location. The starting location is within range of the identification tag reader. In this embodiment, the identification tag reader is operable to detect the presence of the identification tag at a starting location. The identification tag reader continuously or periodically monitors the position of the identification tag. When the identification tag is no longer at the starting location, the identification tag reader transmits a signal to the computing system.

Another embodiment of the present invention comprises a method for reverse-detection merchandising. In this embodiment, the method comprises associating an identification tag with a product. The identification tag is then detected at a starting location with an identification tag reader. This detection by the identification tag reader can be continuous or periodic. When the identification tag reader does not detect the identification tag at the starting location, the identification tag reader transmits a signal a computing system. When the computing system receives the signal from the identification tag reader, the computing system initiates an event in response.

Another embodiment of the present invention comprises a method for reverse-RFID detection merchandising. In this embodiment, the method comprises detecting the presence of at least one RFID tag with an RFID tag reader. The detection of the presence of the RFID tag by the RFID tag reader may be continuous or it may be a periodic detection. When the RFID tag reader detects the presence of at least one RFID tag, the RFID tag reader transmits a 'present' signal. The 'present' signal is transmitted from the RFID tag reader to a computing system. While the RFID tag reader detects the RFID tag, the RFID tag reader continues to transmit a 'present' signal to the computing system. If the RFID tag reader does not detect the RFID tag, then the RFID tag reader does not transmit a signal. Alternatively, the RFID tag reader transmits a 'not present' signal to the computing system. When the computing system does not receive a 'present' signal continuously or at the designated periodic interval, then the computing system initiates an event directed by the computing system. Alternatively, when the computing system receives a 'not present' signal, then the computing system initiates an event directed by the computing system.

The details of the invention and various embodiments can be better understood by referring to the figures of the drawing. Referring to FIGS. 1-5 the system is comprised of a computer with software, the Nanonation NOC, containing the list of products and/or associated RFID tag information for each product, the corresponding links to media assets and control mechanisms to play the media when prompted by serial data events triggered by the movement of a product 111 and associated RFID tag 113. The computer is enclosed in or near product shelves, fixtures, displays or other areas of a public space or retail stores. Shelves 116/216 within the display can be fitted with RFID reader and antenna 118/218 configuration beneath the areas where products 111 will be displayed. Product items for display can be fitted with RFID tags 113 attached to them and the product 111 having the tag attached thereto placed on the shelves 116/216. Shelves 116 and 216 may be mounted to a vertical stands 114 and 214, respectively. Vertical stands 114 and 214 may be supported by bases 112 and 212, and may optionally include supports 213.

The unique RFID card id # can be registered in the computing system and in the software and can be detected by the RFID readers 118/218 attached to the computer such that the RFID # detected can be compared with the list registered in the computing system and software. When present—i.e. registering within the detection field/range of the RFID reader 118/218 as facilitated by the RFID antenna—the product 111 is considered by the software to be inactive (not being picked up by a customer). When a product is removed from the shelf 116/216, the product 111 and RFID tag 113 transition outside of the detection range of the antenna, such that the reader 118/218 no longer reads the tag 113 and the software triggers an event once it drops from the list of tags being read as present by the system 110/210. The corresponding media element is displayed to promote the product removed from the shelf. If multiple items or products 111 are lifted, the media playback elements can play in sequence in the order the products 111 or items are removed from the shelf 116/216. When a product 111 returns to the shelf and there are no other products 111 removed, the system returns to its ideal state (all products inactive or "present") or plays the next media element in the list if other products 111 have been picked up.

The computing system also measures the time between when the product 111 is removed from the shelf 116/216 and when the product 111 is returned to the shelf 116/216. This time can be logged into a file maintained by the computing system. The information in this log file can be utilized for marketing study, metrics and strategy. For example, the log file can provide data regarding how long a customer holds a product 111 and studies a product 111 before returning the product 111 to the shelf 116/216.

A computer (CPU) can be embedded in a display fixture or retail store shelving and connected to RFID readers 118/218 and an antenna installed beneath the shelves where merchandise is placed and one or more displays (LCD, plasma, video monitor, or other comparable display) also embedded in, integral with or placed near the fixture. The display may further comprise a touchscreen. An RFID tag 113 can be attached to or associated with the product 111 and the product 111 or item can be placed on the shelf 116/216. The software can be configured to recognize the IDs of selected tags 113 and those ID numbers can be associated to specific media items (movies, images, web sites, Flash files, and other promotional media) for each of the tags 113 and the products 111 to which they correspond.

When the product 111 with the RFID tag 113 is placed on the target shelf 116/216, the reader 118/218 periodically or continuously reports that the tag is in proximity or "present". The software keeps an internal list of tags 113 that are "present" on the shelf 116/216. When a product is picked up by a consumer and leaves the range of the RFID reader 118 and antenna (typically this can be a couple of inches from the shelf) the software sees or registers that one of the tags 113 has left the list of present tags and then displays the associated media item on the screen 122/222 or screens attached or communicably linked to the system. Screens 122 and 222 may be housed in monitors 120 and 220, respectively.

The event is recorded in a log and sent to a central sever for entry into a database to record the activity. The database of events is accessible for review through web-based reports. When the item is returned to the shelf 116/216, the reader 118/218 and software again sees or registers the tag 113 as "present", adds it back to the list of present tags and deactivates playback of the media. If more than one product 111 is lifted at the same time or while another media item is already being played, the software will add the second and subsequent items to a play list and will play the media items in the sequence in which the products were removed from the shelf.

The software can be configured in various ways to vary the media playback rules. Such as for example, the software may require that in the case of a second product 111 being removed from the shelf during the playback time of the first product's promotional media, the second product 111 must still be removed from the shelf in order for the second product's 111 promotional media to be played. A variation of playback rules can be implemented.

If a retail store operator or product manufacturer seeks to provide point-of-purchase or point-of-decision endorsements, incentives and/or product information to customers in a retail setting while the customer is holding the product they are interested, the present invention satisfies this need. One can place a system 110/210 as described herein into the store environment and associate RFID tags 113 to the products 111 they wish to promote. Once activated, the system can play "attract loops"—general promotions and/or enticements for the consumer to notice the product during a condition where all products are showing "present". A customer who is interested in the product 111 being displayed can walk up to the shelf and pick up one of the products. The system can respond by playing promotional material about the product and/or retailer specific information concerning the product responsive to the product not registering as present with the RFID reader 118/218, which could include celebrity endorsements, technical information, retailer offerings or other relevant material to persuade the consumer to purchase the product they have picked up. The system may be controlled by a computer 230 which is coupled to a memory 232 (as in with the Nanonation NOC). The system may also be coupled to a network device 234 to allow for automated and/or remote updates to the media content.

The system, particularly an interactive media display, may also offer the customer an opportunity to learn more by pointing them toward online and/or interactive information, or provide them with a means to order the product or request assistance using an interactive touch screen integral with the display in the fixture. When the consumer replaces the item on the shelf—or it is restocked if the customer takes the item away with them, the store and/or manufacturing managers may then view reports of which products were picked up by customers, at which time of day, day of week, etc. across one or more displays in one or more locations. This data may then be compared with sales activity to measure lift and sell through rates for a particular product or store. The system may also generate other events, including sending a message to a store employee for assistance, or debiting inventory quantities of the products removed from the shelf and not returned. For example, a message may be sent to a store employee. The store employee may be located on-site at the retail store. In this case, the message would include information concerning the location of the shelf or display, so that the store employee could go to that location to render assistance. Alternatively, the store employee may be located off-site. In this case, the off-site employee communicates with the customer via a digital display located near the shelf or display. For example, the off-site employee may communicate with the customer via a video chat protocol on the digital display.

The various RFID initiated promotional media system examples shown above illustrate a novel use of an RFID tag to initiate playback of promotional media on a display in a retail environment at the point-of-decision for the consumer. A user of the present invention may choose any of the above embodiments, or an equivalent thereof, depending upon the desired application. In this regard, it is recognized that various forms of the subject RFID invention could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A method for motion-detection merchandising comprising:

associating an identification tag with a product;

detecting the identification tag at a starting location with an identification tag reader;

when the identification tag reader does not detect the identification tag at the starting location, transmitting a signal from the identification tag reader to a computing system;

initiating an event in response to the signal received by the computing system.

2. The method of claim 1, wherein the identification tag reader continuously detects the identification tag at the starting location.

3. The method of claim 1, wherein the identification tag reader periodically detects the identification tag at the starting location.

4. The method of claim 1, wherein the event comprises removing the product from a status list.

5. The method of claim 1, wherein the method further comprising the steps:

detecting the identification tag with the identification tag reader at a second location; and transmitting a further signal from the identification tag reader to a computing system.

6. The method of claim 1, wherein the event comprises displaying selected digital media assets corresponding to the product.

7. The method of claim 6, wherein the selected digital media assets comprise celebrity endorsements, technical information, retailer offerings, product information, product endorsements, ordering information, marketing information, or a combination thereof.

8. The method of claim 6, wherein the selected digital media assets comprise movies, images, websites, Flash files, or a combination thereof.

9. A method for reverse-RFID detection merchandising comprising:

detecting the presence of at least one RFID tag with an RFID tag reader;

transmitting a 'present' signal from the RFID tag reader to a computing system; and when the RFID tag reader does not transmit a 'present' signal to the computing system, initiating a first event directed by the computing system.

10. The method of claim 9, wherein the RED tag is attached to or embedded in a product.

11. The method of claim 9, wherein the RFID tag reader is located on or embedded in a shelf or other fixture.

12. The method of claim 11, wherein the shelf or other fixture is in a retail space or a public space.

13. The method of claim 9, further comprising a step of when the RFID tag reader subsequently does transmit a 'present' signal to the computing system, initiating a second event directed by the computing system.

14. The method of claim 13, wherein the second event comprises displaying selected digital media assets.

15. The method of claim 13, further comprising a step of measuring an amount of time between the initiating of the first event and the initiating of the second event.

16. The method of claim 15, further comprising a step of adding the amount of time to a log file maintained by the computer system.

17. The method of claim 9, wherein the first event comprises removing the product from a status list.

18. The method of claim 9, wherein the first event comprises displaying selected digital media assets.

19. The method of claim 18, wherein the selected digital media assets comprise celebrity endorsements, technical information, retailer offerings, product information, product endorsements, ordering information, marketing information, or a combination thereof.

20. The method of claim 18, wherein the selected digital media assets comprise movies, images, websites, Flash files, or a combination thereof.

* * * * *